(12) United States Patent
Slezinskyy et al.

(10) Patent No.: US 9,417,750 B2
(45) Date of Patent: Aug. 16, 2016

(54) SENSE POSITION PREDICTION FOR TOUCH SENSING METHODS, CIRCUITS AND SYSTEMS

(71) Applicant: PARADE TECHNOLOGIES, LTD., Santa Clara, CA (US)

(72) Inventors: Oleh Slezinskyy, Lviv (UA); Viktor Kremin, Lviv (UA)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 0 days.

(21) Appl. No.: 14/977,552

(22) Filed: Dec. 21, 2015

(65) Prior Publication Data

US 2016/0109984 A1 Apr. 21, 2016

Related U.S. Application Data

(63) Continuation of application No. 13/605,092, filed on Sep. 6, 2012, now Pat. No. 9,218,094.

(60) Provisional application No. 61/662,700, filed on Jun. 21, 2012.

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0416* (2013.01); *G06F 2203/04106* (2013.01)

(58) Field of Classification Search
None
See application file for complete search history.

(56) References Cited

U.S. PATENT DOCUMENTS

| 6,985,137 | B2 | 1/2006 | Kaikuranta |
| 7,847,789 | B2 | 12/2010 | Kolmykov-Zotov et al. |
| 2006/0227115 | A1 | 10/2006 | Fry |
| 2008/0062140 | A1 | 3/2008 | Hotelling et al. |
| 2009/0193366 | A1 | 7/2009 | Davidson |
| 2010/0073301 | A1 | 3/2010 | Yousefpor et al. |
| 2011/0081944 | A1 | 4/2011 | Tsegay |
| 2012/0001861 | A1 | 1/2012 | Townsend et al. |
| 2012/0062474 | A1 | 3/2012 | Weishaupt et al. |
| 2013/0181908 | A1 | 7/2013 | Santiago et al. |

FOREIGN PATENT DOCUMENTS

WO WO2011068001 A1 6/2011

OTHER PUBLICATIONS

Atmel Corporation, Atmel maXTouch S Series Touchscreen Controllers, 2012, downloaded from http://www.atmel.com, 4 pgs.
Baanto International Ltd., Palm Detection & Rejection, 2011, downloaded from http://www.baanto.com, 3 pgs.
Microsoft Corporation, See Why Perceptive Pixel is a Technology Leader, 2012, downloaded from http://www.perceptivepixel.com, 1 pg.

*Primary Examiner* — Nicholas Lee
(74) *Attorney, Agent, or Firm* — Morgan, Lewis & Bockius LLP

(57) ABSTRACT

A method can include determining multiple sensed positions of an object path in a touch sense region; generating at least a first predicted position from the sensed positions; and filtering a sense position, including associating the sense position with the object path if it is within a first proximity to at least the first predicted position, and not associating the sense position with the object path if it is outside of at least the first proximity from the first predicted position.

20 Claims, 15 Drawing Sheets

| Gesture Types | False touches appearing as split touches (quantity) | False touches detected and rejected by prediction algorithm (quantity) | Percent of corrected errors |
|---|---|---|---|
| Circular | 246 | 240 (quantity) | 97% |
| Zig Zag | 354 | 338 (quantity) | 95% |
| Flicks | 307 | 293 (quantity) | 95% |

(BACKGROUND)

(BACKGROUND)

(BACKGROUND)

(BACKGROUND)

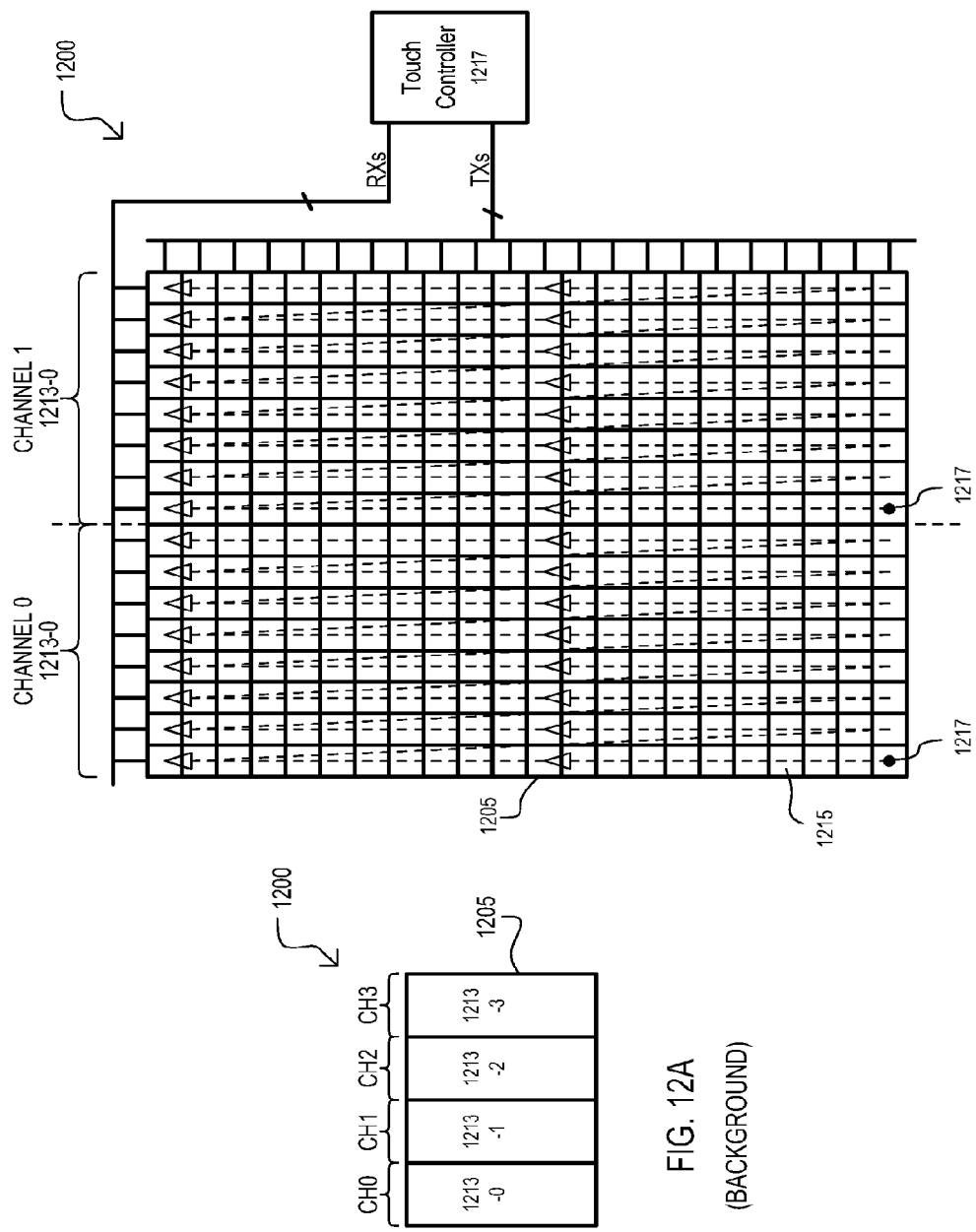
FIG. 12B (BACKGROUND)
FIG. 12A (BACKGROUND)

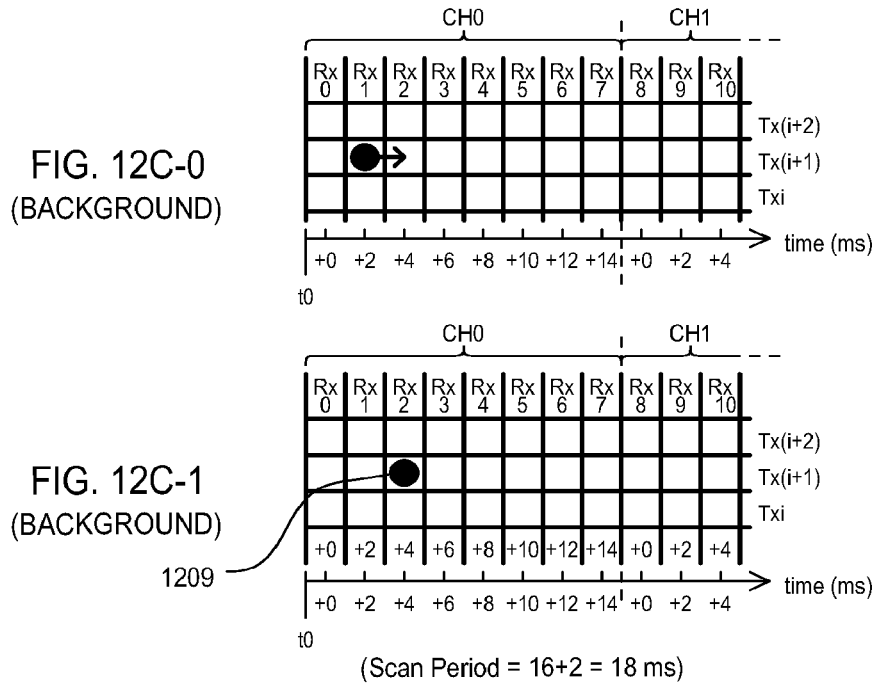
FIG. 12C-0 (BACKGROUND)
FIG. 12C-1 (BACKGROUND)
(Scan Period = 16+2 = 18 ms)
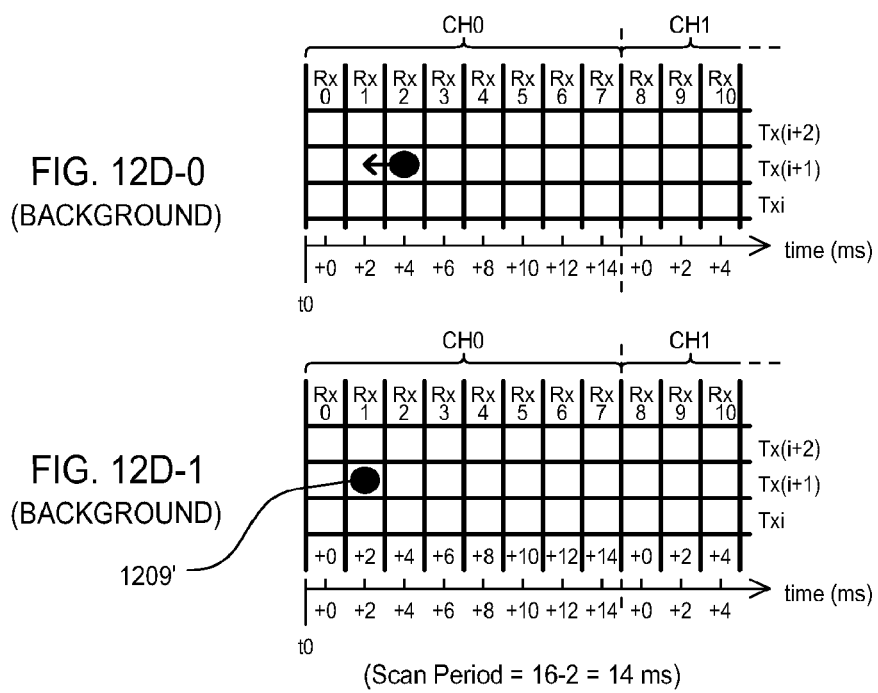
FIG. 12D-0 (BACKGROUND)
FIG. 12D-1 (BACKGROUND)
(Scan Period = 16−2 = 14 ms)

(BACKGROUND)

(BACKGROUND)

(Scan Period = 16-12 = 2 ms)

(BACKGROUND)

(BACKGROUND)

(Scan Period = 16+14 = 30 ms)

(BACKGROUND)

(BACKGROUND)

FIG. 12H-1 (BACKGROUND)

FIG. 12H-2 (BACKGROUND)

FIG. 12H-3 (BACKGROUND)

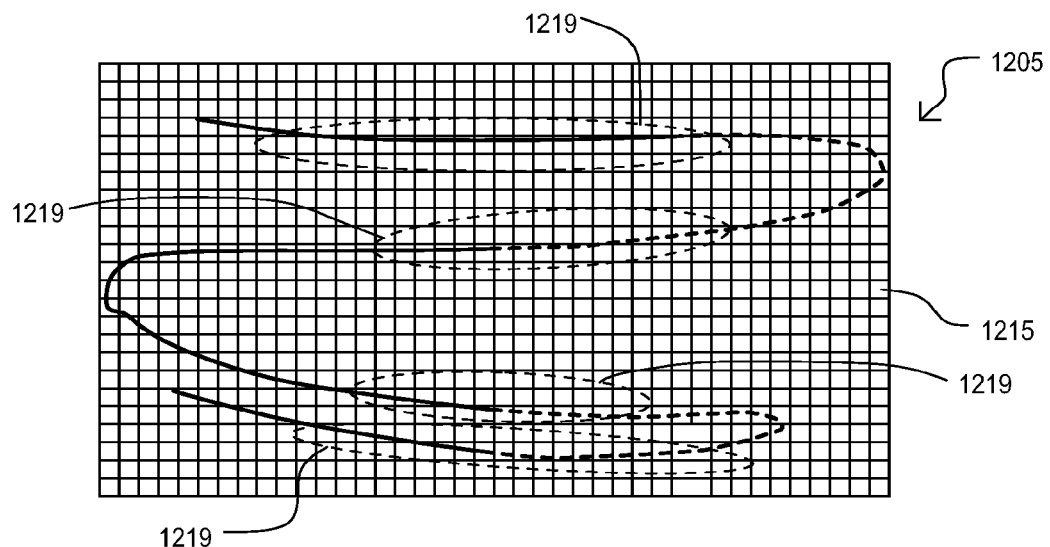
FIG. 12I-0     (BACKGROUND)
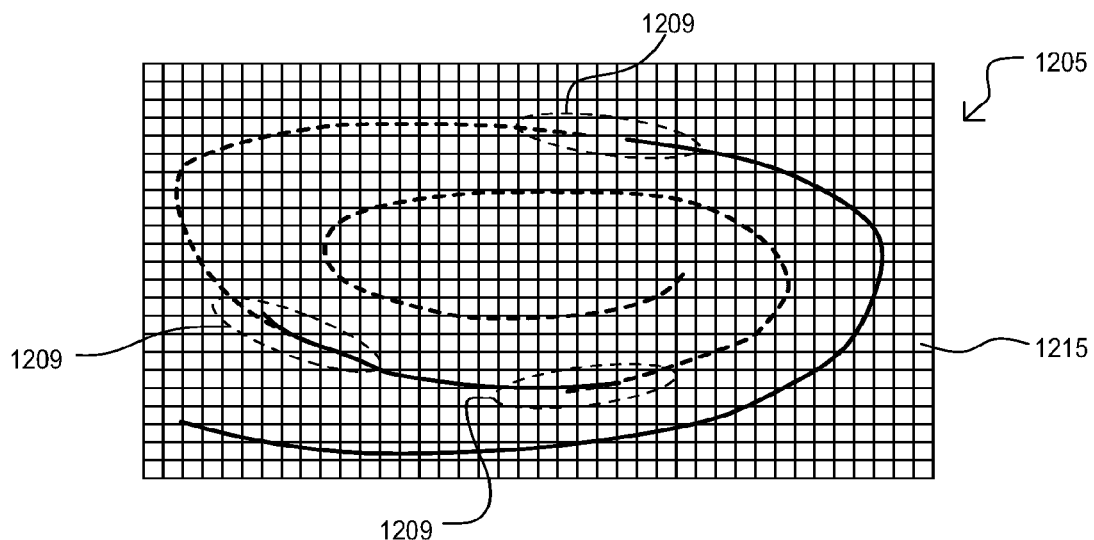
FIG. 12I-1     (BACKGROUND)

SENSE POSITION PREDICTION FOR TOUCH SENSING METHODS, CIRCUITS AND SYSTEMS

PRIORITY CLAIM AND RELATED APPLICATIONS

This application is a continuation of U.S. patent application Ser. No. 13/605,092 filed Sep. 6, 2012, entitled "Sense Position Prediction For Touch Sensing Methods, Circuits And Systems," which itself claims priority to U.S. Provisional Patent Application No. 61/662,700 filed on Jun. 21, 2012, both of which are incorporated by reference in their entirety.

TECHNICAL FIELD

The present disclosure relates generally to proximity sensing systems, including touch sensing systems, and more particularly to capacitance proximity/touch sensing systems and methods.

BACKGROUND

Many electronic devices, including cell phones and tablet computers, include a touch screen as an input device. A touch screen can include an array of sensors disposed over a display for detecting the proximity of objects (i.e., touches on the surface of the touch screen).

In some devices, it is desirable to track the touches of different sensed objects (such as fingers). FIGS. 11A-0/1 show a "track" 1101 of a single finger 1103 as it moves across a touch surface 1105. Finger 1103 can initially contact at position 1107. As the finger moves, various other contact positions 1109 are detected to determine the track 1101.

The single object track 1101 of FIGS. 11A-0/1 is in contrast to separate touches, as shown in FIGS. 11B-0/1. FIG. 11B-0 shows a first finger 1103 contacting a touch surface 1105 at contact position 1107. FIG. 11B-1 shows a second finger 1103' contacting a touch surface at contact position 1111 (first finger 1103 is not contacting the touch surface 1105). Contact positions 1107 and 1111 can be associated with different "tracks".

To better understand aspects of the embodiments, conventional capacitive sensing operations will now be described. FIGS. 12A and 12B shows a capacitance sensing system 1200. FIG. 12A is a diagram showing a sense matrix 1205 of a system 1200. A sense matrix 1205 can be divided into four sense channels (1213-0 to -3) that can be scanned simultaneously for touch events.

FIG. 12B shows system 1200 with two channels 1213-0/1 shown in more detail. A sense matrix 1205 is a mutual capacitance sensing network having capacitance sense elements (one shown as 1215) formed at the intersection of transmit electrodes (TXs) and receive electrodes (RXs). Arrows shown by dashed lines indicate a direction of scanning in each channel 1213-0/1. Scanning can start at a start element (shown as 1217) in each channel 1213-0/1 by a touch controller 1217 driving the corresponding TX lines. In the embodiment shown, TX lines can be activated sequentially moving upward in a vertical direction. A next RX line can (moving left-to-right) can be selected, and the TX activation cycle repeated.

In such a scanning arrangement, an effective scan period can vary according to an object (e.g., finger) direction and/or position. Such differences are shown in FIGS. 12C-0 to 12F-1.

FIGS. 12C-0 to 12F-1 show a portion of a sense matrix like that of FIG. 12B. All of a first channel (CH0) is shown, and a portion of a second channel (CH1) is shown. Each channel includes eight RX electrodes (RX0 to RX7, R8 to R15). Three of many TX electrodes are shown as Txi to Tx(i+2). It is assumed that a touch controller 1217 scans RX electrodes in a channel every 2 ms (approximately), moving left to right. Further, an object (e.g., finger) can be moving at about 0.3 m/s over sense elements having a size of about 5 mm.

FIGS. 12C-0/1 show an object that moves in the direction of RX scanning. In such a movement, a scanning period can be conceptualize as being 16 ms+2 ms=18 ms, as the scanning must complete a full set of RX electrodes before "catching up" to the new object position 1209.

FIGS. 12D-0/1 show an object that moves in the opposite direction to that of FIGS. 12C-0/1. In such a movement, a scanning period can be conceptualize as being 16 ms−2 ms=14 ms, as the scanning would detect the new object position 1209' before completing a scan of all RX electrodes of the channel.

FIGS. 12E-0/1 show an object that moves in the direction of RX scanning, but across a channel boundary (from channel CH0 to channel CH1). In such a movement, a scanning period can be conceptualize as being 16 ms+14 ms=2 ms, as the new object position 1209" occurs in a first electrode (RX8) of the next channel (CH1).

FIGS. 12F-0/1 show an object that moves in a direction opposite to RX scanning, but across a channel boundary (from channel CH1 to channel CH0). In such a movement, a scanning period can be conceptualize as being 16 ms+14 ms=30 ms, as the new object position 1209" can be missed on a first RX scan of channel CH0 (16 ms), and then is subsequently detected on a next RX scan (14 ms).

Thus, in the above conventional scanning approach, a scanning period of a moving finger can vary from 2 ms to 30 ms, depending upon direction and/or position. Such differences can result in an object movement being interpreted as having an irregular velocity. This is shown by FIG. 12G.

FIG. 12G shows an actual track 1201 of an object (e.g., finger) on a sense matrix 1205 having an array of sense elements (one shown as 1215). It is assumed that due to scanning directions and channel divisions, scanning periods can vary as described above. Further, it is assumed that an actual track 1201 can have a relatively constant velocity, at least in the horizontal direction. FIG. 12G shows touch position determinations (one shown as 1209), made by a centroid calculation. As shown, touch positions (e.g., 1209) can reflect an irregular velocity.

The above variations on scanning direction and object location can be compounded when an object is fast moving (e.g., 1 to 3 m/s). FIGS. 12H-0 to 12H-7 show how a fast moving object on one track may be misinterpreted.

FIG. 12H-0 to 12H-3 show portions of a sense matrix 1205 having an array of sense elements (one shown as 1215). Each figure shows an actual object track 1201 along with detected touch position determinations (as bold boxes). Count values, which reflect a capacitance change, are also shown for each electrode.

FIG. 12H-0 shows how a fast vertical track can generate three separate contact positions. FIG. 12H-1 shows how a fast horizontal track can generate multiple positions. FIG. 12H-2 shows how a fast diagonal track can generate multiple positions. FIG. 12H-3 shows how a fast curved track can generate a "large object" (which can be discarded as an invalid touch in some processes).

Due the effects noted above, the track of a single object may be misinterpreted as two different objects at fast (high velocity) speeds, leading to "splitting" or "touch separation" (i.e., a single track misinterpreted as different tracks). FIGS. 12I-0/1 shows examples of touch splitting. FIGS. 12I-0/1 both show detected tracks from a single object track. Different tracks are delineated by solid and dashed lines. The single tracks are shown to separate in separations areas (1219).

Misinterpretation of fast moving objects can lead to erroneous inputs in touch/capacitive sensing systems.

BRIEF DESCRIPTION OF THE DRAWINGS

FIGS. 12A and 12B are diagrams showing a conventional mutual capacitive sensing system.

FIGS. 12C-0 to 12F-1 are diagrams showing how object detection can vary according to object movement and position in a conventional system like that of FIG. 12A/B.

FIGS. 12H-0 to 12H-3 are diagrams showing how fast moving objects can be misinterpreted in a conventional system like that of FIG. 12A/B.

FIGS. 12I-0 and 12I-1 are diagrams showing how a tracking of a fast moving objects can be misinterpreted as different tracks in a conventional system like that of FIG. 12A/B.

DETAILED DESCRIPTION

Various embodiments will now be described that show object proximity sensing circuits, systems and methods that can generate one or more predicted positions of an object based on previously sensed positions. If a newly sensed position is within a predetermined proximity to a predicted position, the newly sensed position can be associated with the previously sensed positions (e.g., determined to belong to the same track). In some embodiments, predicted positions are based on a non-linear relationship with respect to previous sensed positions.

Figure 1A:
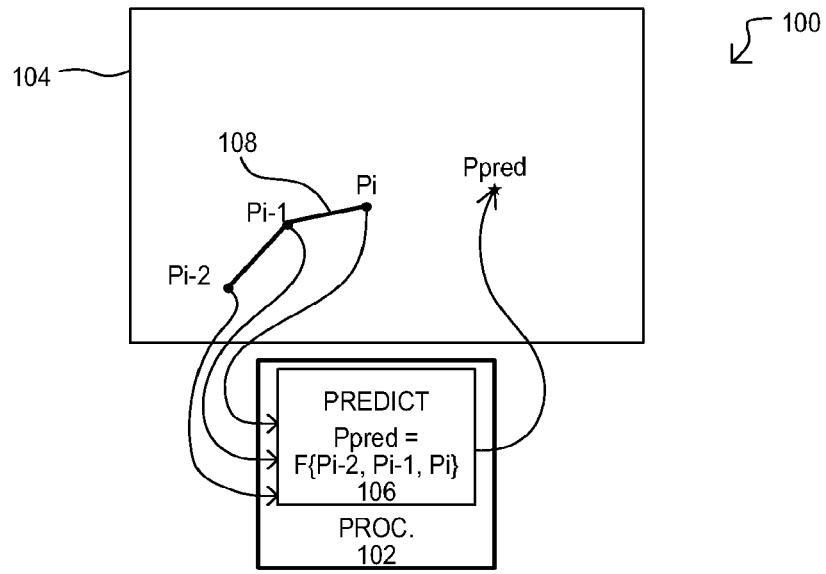
FIGS. 1A and 1B are diagrams showing a sensing system and operations according to embodiments.
Figure 1B:
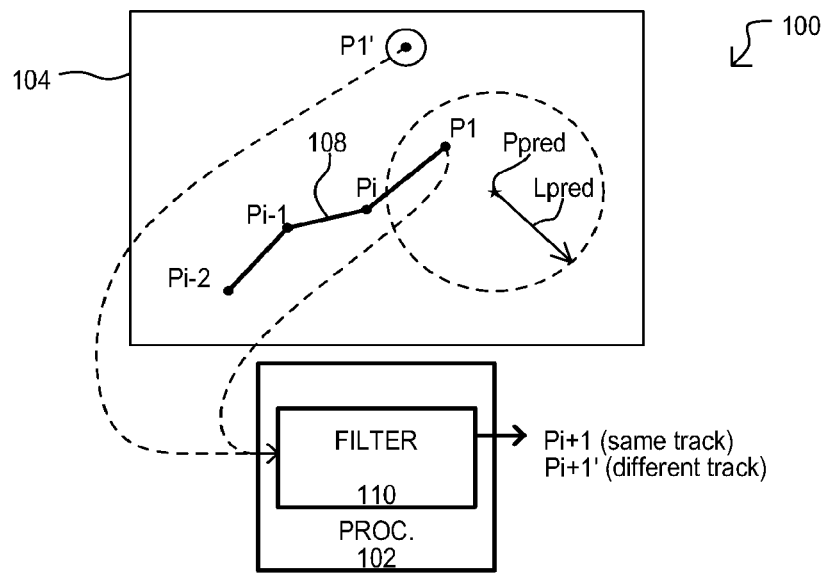

FIGS. 1A and 1B show a sensing system 100 and corresponding operations according to embodiments. A system 100 can include a processing section 102 configured to receive detected positions of objects in a sense region 104. In some embodiments a sense region 104 can be capacitance sense array having a number of sense elements, where a capacitance change of an element can indicate an object location. In a very particular embodiment, a sense region 104 can be a mutual capacitance sense array, with sense elements occurring at locations where transmit electrodes cross receive electrodes. However, in other embodiments a sense region 104 can include various other object sensors. In one alternate embodiment, a sense region 104 can utilize optical sensing to determine an object position.

Referring to FIG. 1A, a processing section 102 can include a prediction section 106 can receive position information on a number of previously sensed object positions (Pi-2, Pi-1 and Pi) taken at different points in time. Position Pi-2 can be detected prior to position Pi-1, which is detected prior to Pi. In the particular embodiment shown, position Pi can be the latest position for an object in a path 108.

Referring still to FIG. 1A, based on object positions (Pi-2, Pi-1 and Pi), a prediction section 106 can generate one or more predicted positions (one shown as Ppred). A prediction section 106 can generate a predicted position based on a function of the previously sensed positions (shown as F{Pi-2, Pi-1, Pi}). In particular embodiments, such a function can be a non-linear function.

Referring to FIG. 1B, a processing section 102 can also include a filter section 110. A filter section 110 can determine whether or not a newly sensed position is to be considered part of the existing path 108, or is to be filtered out. In some embodiments, a filter section 110 can determine if a newly sensed position is within a predetermined proximity of one or more predicted positions. In the particular embodiment of FIG. 1B, filter section 110 can determine if a newly sensed position is within a distance Lpred of predicted position Ppred.

Referring still to FIG. 1B, two different possible newly sensed positions are shown: P1 and P1,' to illustrate a filtering action. New position P1 is within the predetermined proximity of Ppred. Thus, new position P1 would be associated with path 108. In contrast, new position P1' is outside of the predetermined proximity of Ppred. Thus, new position P1' would not be associated with path 108.

Figures 0, 11A:
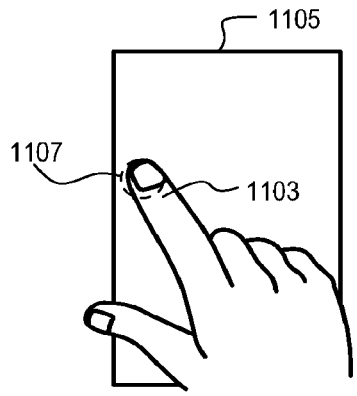
FIGS. 11A-0 to 11B-1 are diagrams showing different input types for a touch surface.
Figures 1, 11A:
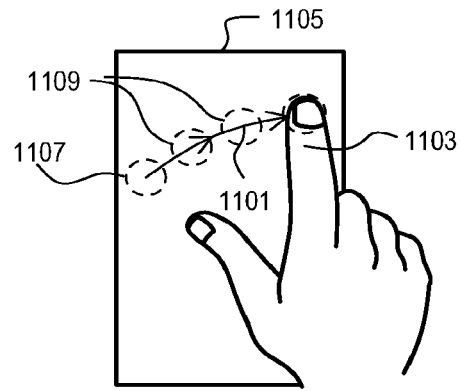
Figures 0, 11B:
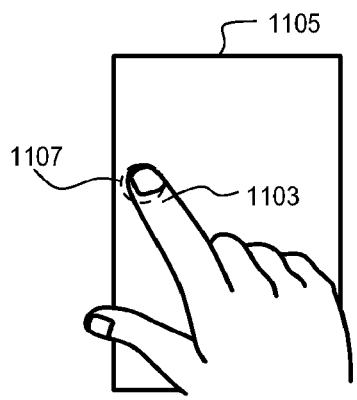
Figures 1, 11B:
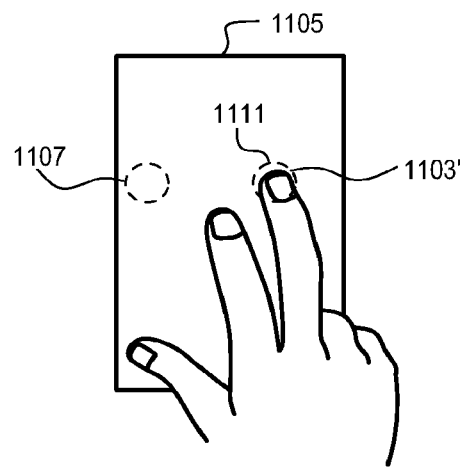
Figures 0, 12E:
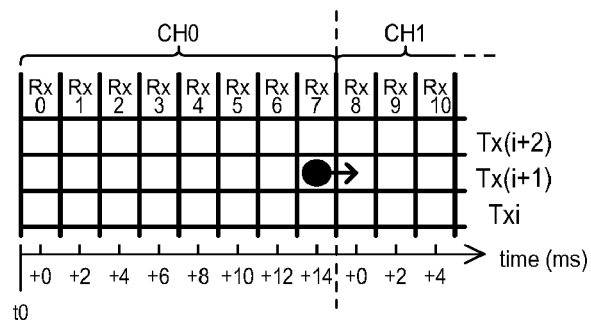
Figures 1, 12E:
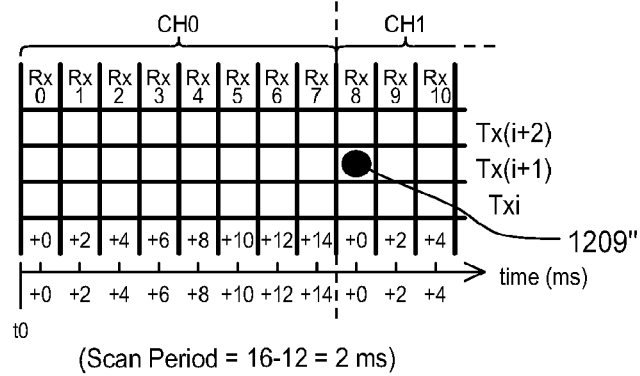
Figures 0, 12F:
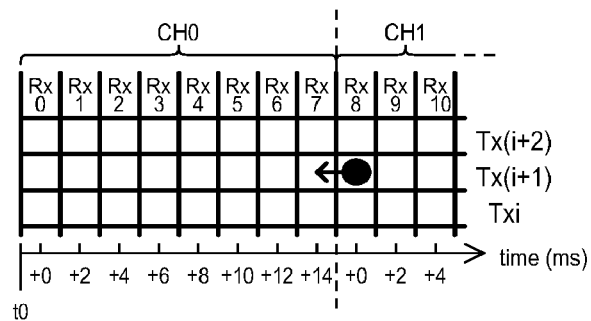
Figures 1, 12F:
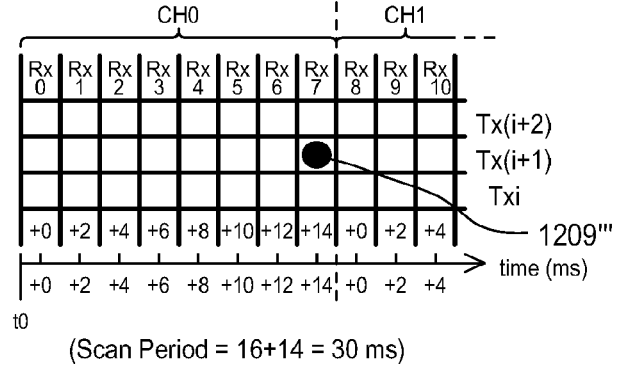
Figure 12G:
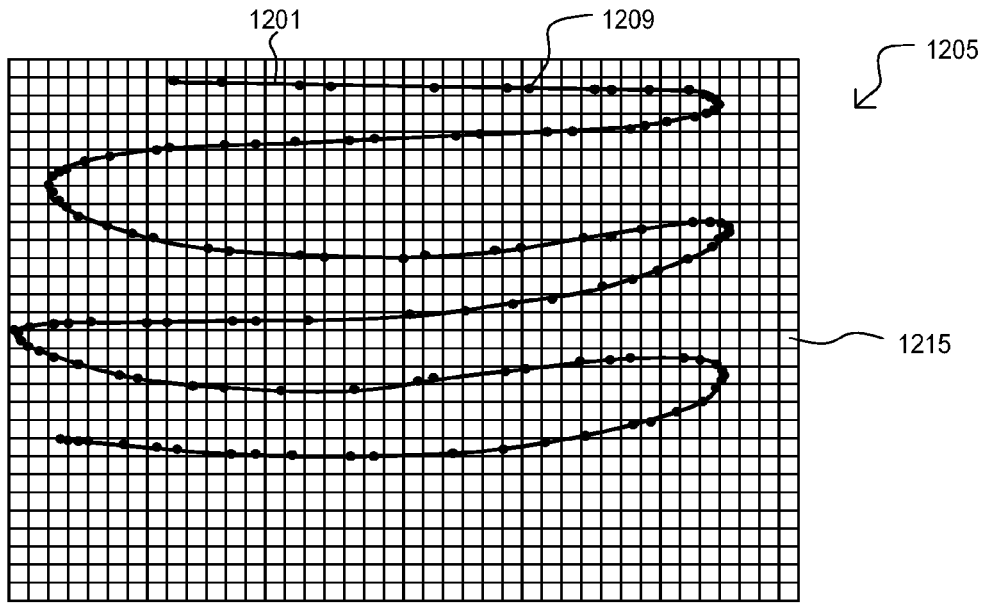
FIG. 12G is a diagram showing how object movement can be misinterpreted as having a variable velocity in a conventional system like that of FIG. 12A/B.
Figures 0, 12H:
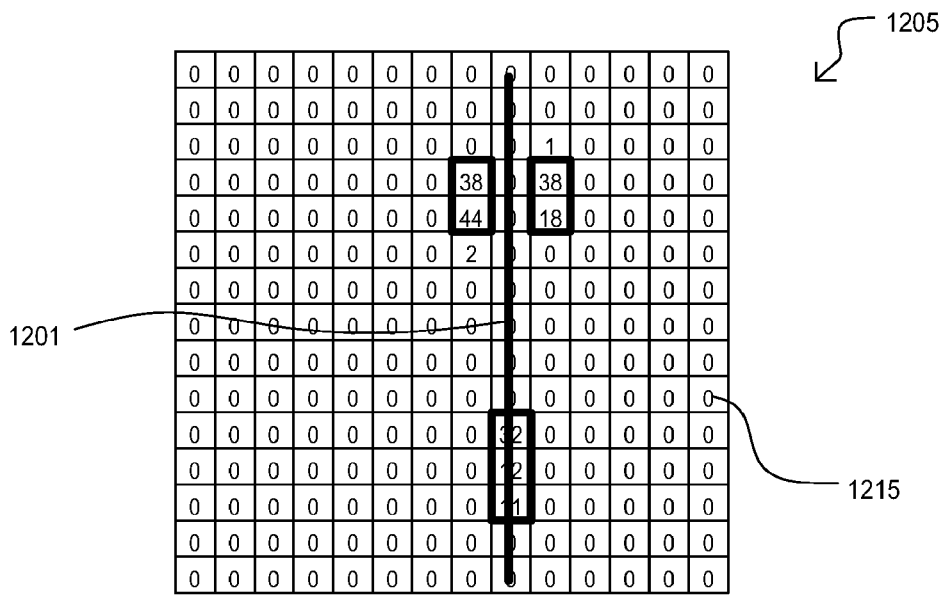

A system having prediction and filtering as shown in FIG. 1 can enable accurate tracking of an object path despite irregularities that can be introduced by scan directions, sensor group division (e.g., channel boundaries) and/or fast finger motions. Systems according to embodiments can thus prevent an unwanted generation of unrelated separate sense events in response to a single track and/or prevent the erroneous splitting of single tracks into multiple tracks.

Figure 2:
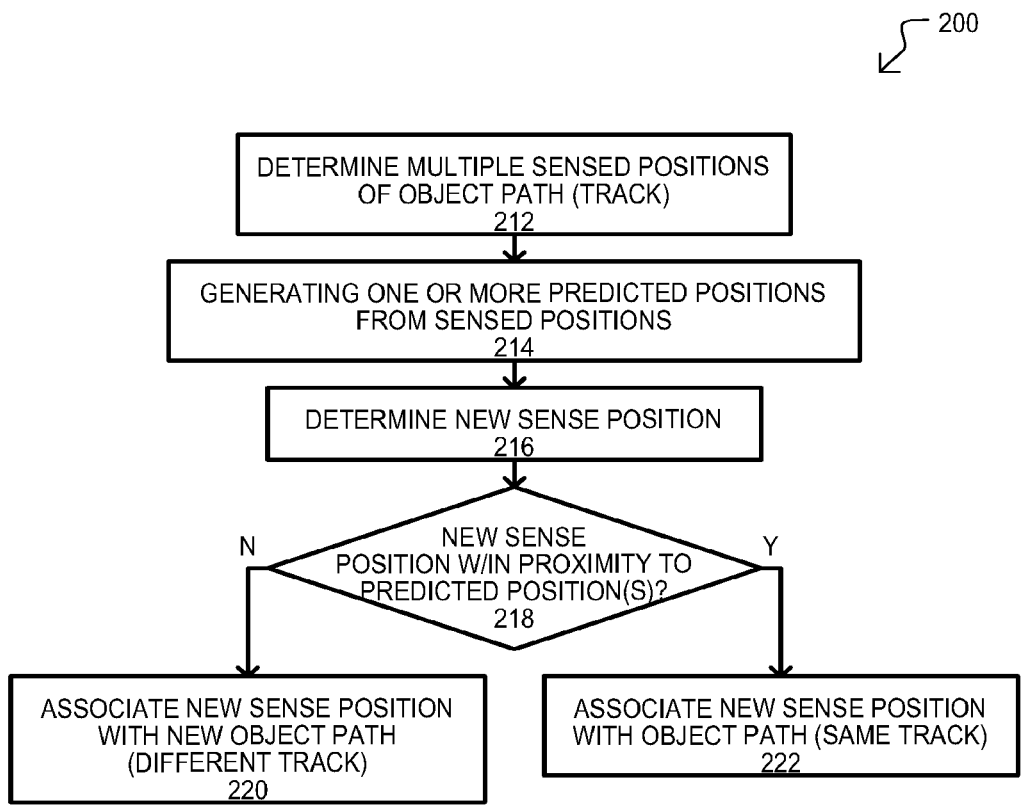
FIG. 2 is a flow diagram of a method according to an embodiment.

Referring now to FIG. 2, a method 200 according to an embodiment is shown in a flow diagram. A method 200 can include determining multiple sensed positions of an object path (212). Such an action can include sensing an object within a sense area, including touch sensing, which can rely in resistive, capacitive, or any other suitable sensing method. Such multiple sensed positions can correspond to a same object, and so can represent a same "track".

A method 200 can generate one or more predicted positions based on the sensed positions (214). As noted previously, in some embodiments generating predicted positions can be a non-linear function.

A new sense position can be determined (216). Such an action can include a continuation of those noted for box 212. If the new sense position is within a proximity to predicted position(s) (Y from 218), the new position can be associated with the object path (222). If the new sense position is not within a proximity to a predicted position(s) (N from 218), the new position is not associated with a new object path. In the embodiments shown, such a sense position can be associated with a different object path (224).

Figure 3:
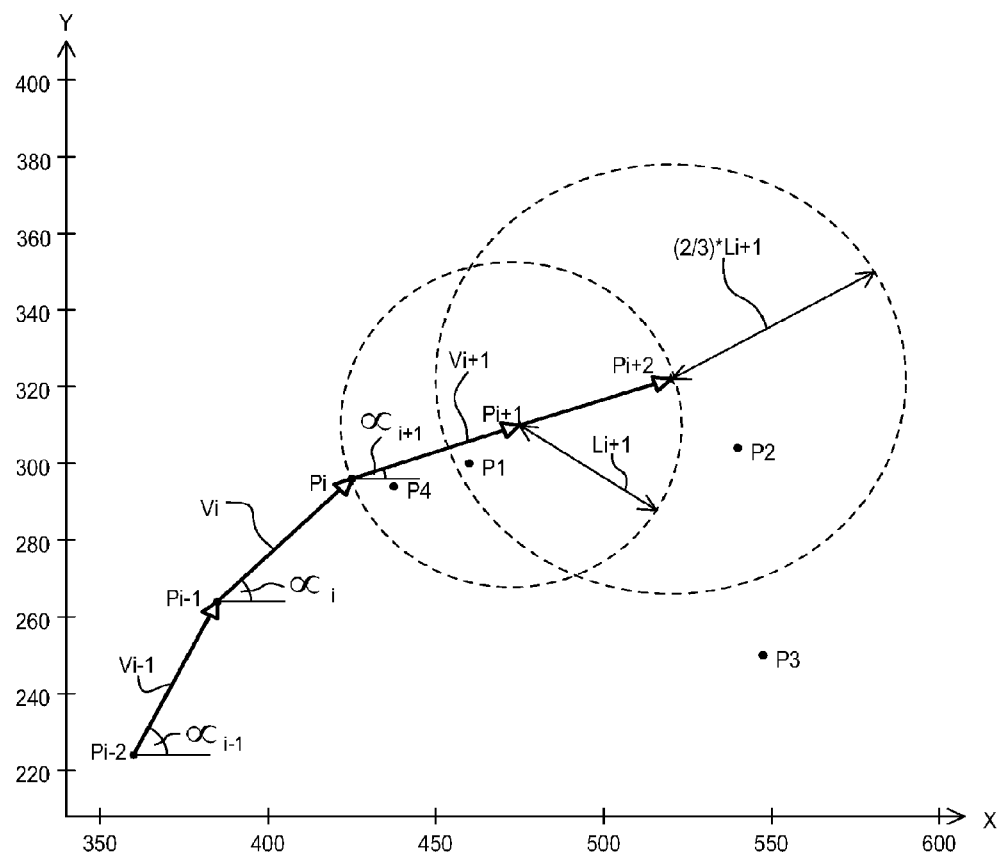
FIG. 3 is graphical representation of a method according to an embodiment.

Referring now to FIG. 3, a method according to a further embodiment is shown in a graphical representation. FIG. 3 is a graph showing sensed positions ($P_{i-2}$, $P_{i-1}$, $P_i$) of an object, as well as predicted positions ($P_{i+1}$, $P_{i+2}$).

In the embodiment shown, multiple predicted positions (in this case two) can be generated from multiple sensed positions (in this case three). The method can be conceptualized as generating two prediction vectors, from path vectors derived from the sensed positions. A first path vector $V_{i-1}$ can be vector extending from sensed position $P_{i-2}$ to $P_{i-1}$, having an angle $\alpha_{i-1}$ (with respect to the X-Y coordinate system). A second path vector $V_{i-2}$ can be a vector extending from sensed position $P_{i-1}$ to $P_i$, and having an angle $\alpha_i$.

A prediction vector $V_{i+1}$ can point from a last sensed position ($P_i$) to predicted position $P_{i-1}$. Vector $V_{+1}$ can have a magnitude $L_{i+1}$, and extend at an angle of $\alpha_{i+1}$. In one particular embodiment, a prediction vector magnitude ($L_{i+1}$) can be given by:

$$L_{i+1} = \operatorname{sqrt}(X_{i+1} + Y_{i+1}), \text{ where}$$

$$X_{i+1} = \Delta x_i \text{ if } (\Delta x_i \geq X_i) \text{ or } K_1 * X_i + K_2 * \Delta x_i \text{ if } (\Delta x_i < X_i)$$

$$Y_{i+1} = \Delta y_i, \text{ if } (\Delta y_i \geq Y_i) \text{ or } K_1 * Y_i + K_2 * \Delta y_i \text{ if } \Delta y_i < Y_i; \text{ and}$$

$\Delta x_i$ is a difference between x coordinates of two prior sensed positions; $\Delta y_i$ is a difference between y coordinates of the two prior sensed positions; $X_i$ is a previous predicted difference; and $Y_i$ is a previous second predicted difference; and $K_1$ and $K_2$ are constants. In a very particular embodiment, $K_1 = 3/4$ and $K_2 = 1/4$.

In such a relationship, a vector length $L_{i+1}$ is derived in a fashion that is not linear, passing length values (Li) if they are greater than a current predicted length value $L_{i+1}$. In particular embodiments, a predicted vector length can be generated with an infinite impulse response (IIR) type filter.

In one particular embodiment, a vector length is stored as a squared value, as in the relationship:

$$L_{i+1}^2 = X_{i+1}^2 + Y_{i+1}^2$$

for ease of calculation.

For a fast moving object (e.g., fast finger), changes in direction may not take sharp turns. Accordingly, an angle of a prediction vector ($V_{i+1}$) can be selected based on angles of previous changes in direction.

In one particular embodiment, a prediction vector angle ($\alpha_{i+1}$) can be given by:

$$\alpha_{i+1} = \alpha_i + (\alpha_i - \alpha_{i-1}), \text{ where}$$

$\alpha_i$ is the angle of a vector between the last sensed position (e.g., $P_i$) and a second position ($P_{i-1}$) sensed prior to the last sensed position, and $\alpha_{i-1}$ is the angle of a vector between the second position ($P_{i-1}$) and a third position ($P_{i-2}$) sensed prior to the second sensed position.

In one embodiment, prediction vector angle ($\alpha_{i+1}$) can be calculated by:

$$\alpha_{i+1} = \alpha_i + (\alpha_i - \alpha_{i-1}) = 2*\alpha_i - \alpha_{i-1} = 2*\arctan(\Delta y_i / \Delta x_i) - \arctan(\Delta y_{i-1} / \Delta x_{i-1}).$$

However, alternate embodiments can utilize any suitable calculation method, including other trigonometric functions.

Accordingly, in an X-Y coordinate system, coordinates of a first predicted position ($P_{i+1}$)[x,y] can be given by:

$$P_{i+1}[x,y] = P_i[x,y] + [\Delta x_{i+1}, \Delta y_{i+1}], \text{ where}$$

$P_i[x,y]$ are the coordinates of the last sensed position, $\Delta x_{i+1} = L_{i+1} * \sin(\alpha_{i+1})$, and $\Delta y_{i+1} = L_{i+1} * \tan(\alpha_{i+1})$.

In some embodiments, a second predicted position $P_{i+2}$ can be generated using a second prediction vector ($V_{i+2}$) that is a scalar of the first prediction vector ($V_{i+1}$). In one particular embodiment $V_{i+2} = 2 * V_{i+1}$.

Accordingly, in an X-Y coordinate system, coordinates of a second predicted position ($P_{i+2}$)[x,y] can be given by:

$$P_{i+1}[x,y] = P_i[x,y] + [2*\Delta x_{i+1}, 2*\Delta y_{i+1}].$$

Having generated multiple predicted positions ($P_{i+1}$ and $P_{i+2}$), such positions can be used to filter new sensed positions based on a proximity to such positions. If a newly sensed position is within a certain proximity to predicted position $P_{i+1}$, or within another proximity to predicted position $P_{i+2}$, it can be determined to be part of the same track as sensed positions ($P_{i-2}$, $P_{i-1}$, $P_i$).

In one very particular embodiment, if a newly sensed position is less than a distance $L_{i+1}$ from predicted position $P_{i+1}$ or less than a distance $2/3 * L_{i+1}$ from predicted position $P_{i+2}$, the newly sensed position can be considered part of the same track. Such a calculation can operate on squared values, for faster or less complex computation:

$$X_{diff1}^2 + Y_{diff1}^2 < L_{i+1}^2; \text{ same track}$$

$$X_{diff2}^2 + Y_{diff2}^2 < (4/9) L_{i+1}^2; \text{ same track}$$

where $X_{diff1}$ is a difference between x coordinates of predicted position $P_{i+1}$ and the newly sensed position, $Y_{diff1}$ is a difference between y coordinates of predicted position $P_{i+1}$ and the newly sensed position, $X_{diff2}$ is a difference between x coordinates of predicted position $P_{i+2}$ and the newly sensed position, and $Y_{diff2}$ is a difference between y coordinates of predicted position $P_{i+2}$ and the newly sensed position.

Referring still to FIG. 3, four examples of newly sensed positions are shown as P1, P2, P3 and P4. Position P1 is within a proximity $L_{i+1}$ of predicted position $P_{i+1}$ (where $L_{i+1}$ is distance from last sensed position $P_i$ and $P_{i+1}$) and also within a proximity $2/3 * L_{i+1}$ of predicted position $P_{i+2}$ (where $L_{i+1}$ is distance from last sensed position $P_i$ and $P_{i+2}$), and so can be considered within the same track. Position P2 is not within a proximity $L_{i+1}$ of predicted position $P_{i+1}$, but is within a proximity $2/3 * L_{i+1}$ of predicted position $P_{i+2}$, and so can be considered within the same track. Position P3 is not within a proximity $L_{i+1}$ of predicted position $P_{i+1}$ and not within a proximity $2/3 * L_{i+1}$ of predicted position $P_{i+2}$, and so is not considered to be within the same track.

In some embodiments, if more than one position is detected, a position closer to the last sensed position can be discarded or such multiple positions can be averaged with one another. For example, referring still to FIG. 3, if positions P4 and P1 are both sensed, position P4 can be discarded or averaged with position P1.

While a method like that shown in FIG. 3 can provide improved responses over conventional sensing approaches that might misinterpret fast moving objects, such an embodiment may fail to detect sharp turns in a path. This is shown in FIG. 4.

Figure 4:
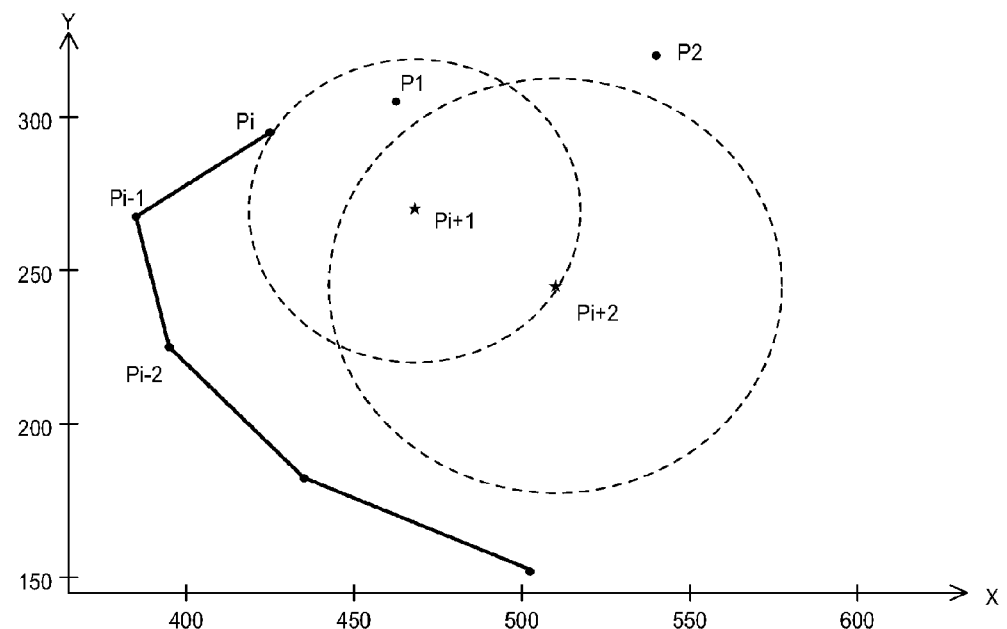
FIG. 4 is graphical representation of a method according to an embodiment with a sharp turn in a sensed track.

FIG. 4 is a graphical representation of a method like that of FIG. 3, but with a sharp turn in an object path. In FIG. 4, predicted positions $P_{i+1}$ and $P_{i+2}$ are generated from previous sensed positions ($P_{i-2}$, $P_{i-1}$, $P_i$) in manner like that described for FIG. 3.

Referring still to FIG. 4, while a newly sensed position P1 can be determined to form part of the same track, a sensed position P2 on the changed trajectory may fall outside of the filter proximities, and so may be erroneously interpreted as not belonging to the track.

Figure 5:
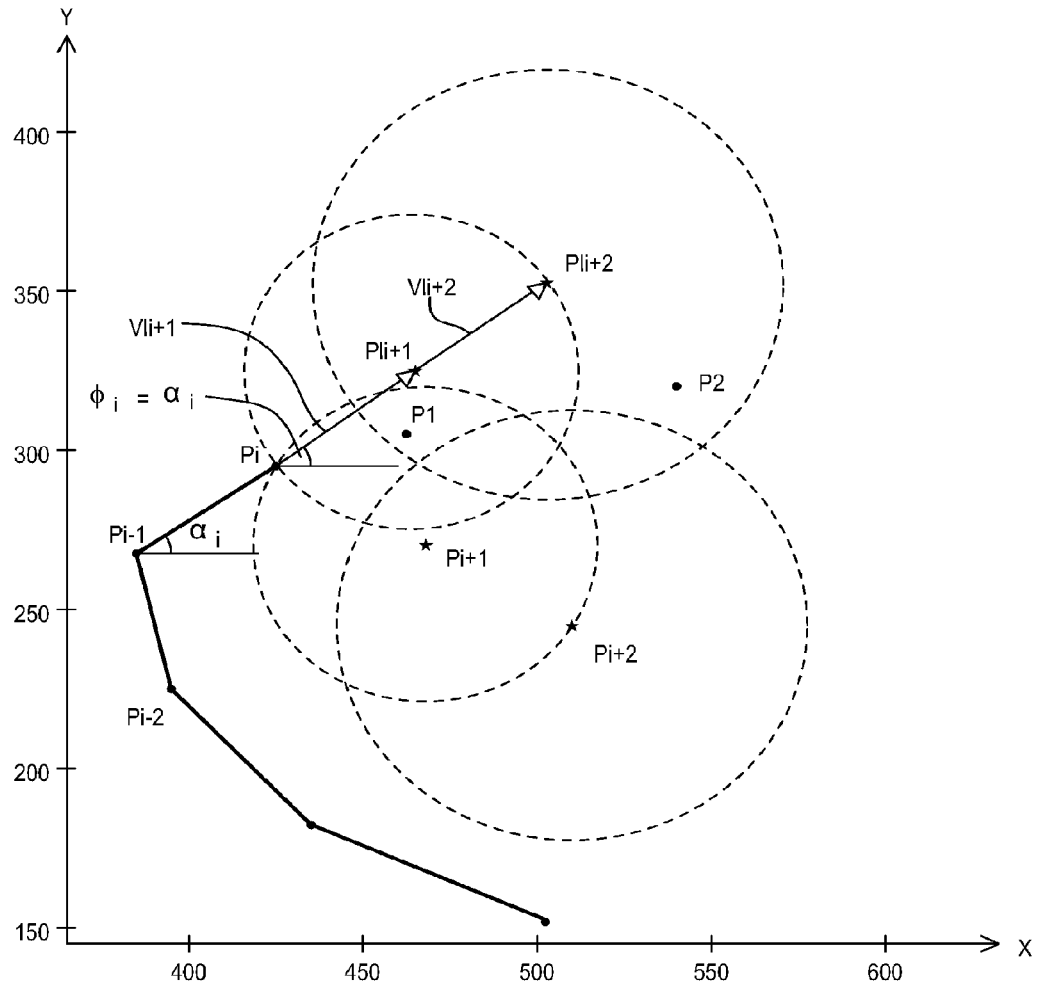
FIG. 5 is graphical representation of a method according to another embodiment that generates different predicted positions according to different calculations.

Referring now to FIG. 5, a method according to a further embodiment is shown in graphical representation. FIG. 5 shows the features of FIG. 4. However, in addition, FIG. 5 shows the generation of two more predicted positions (P1$_{i+1}$, P1$_{i+2}$) from sensed positions (P$_{i-2}$, P$_{i-1}$, P$_i$). The additional predicted positions will be referred to as third and fourth predicted positions, and can be conceptualized as "linear predictions", as they follow a last detected trajectory.

A third prediction vector V1$_{i+1}$ can point from a last sensed position (P$_i$) to third predicted position P1$_{i+1}$. Vector V1$_{i+1}$ can have a magnitude the same as vector V$_{i+1}$ (described in FIG. 3. However, a third prediction vector angle ($\phi_{i-1}$) can be the same as the last sensed position angle:

$$\phi_{i+1}=\alpha_i.$$

A fourth predicted position vector V1$_{i+2}$ can be a scalar of third prediction vector (V1$_{i+2}$). In one particular embodiment V1$_{i+2}$=2*V1$_{i+1}$.

Newly sensed positions can then be filtered based on proximity to the four predicted positions (P$_{i+1}$, P$_{i+2}$, P1$_{i+1}$ and P1$_{i+2}$). In one very particular embodiment, if a newly sensed position is less than a distance L$_{i+1}$ from predicted positions P$_{i+1}$ or P1$_{i+1}$ or less than a distance ⅔*L$_{i+1}$ from predicted positions P$_{i+2}$ or P1$_{i+2}$, the newly sensed position can be considered part of the same track. Such a calculation can operate on squared values, as described for FIG. 3.

As shown in FIG. 5, newly sensed position P2 can now be determined to be part of the same track as (P$_{i-2}$, P$_{i-1}$, P$_i$), unlike the approach shown in FIG. 4.

Figures 6, 7:
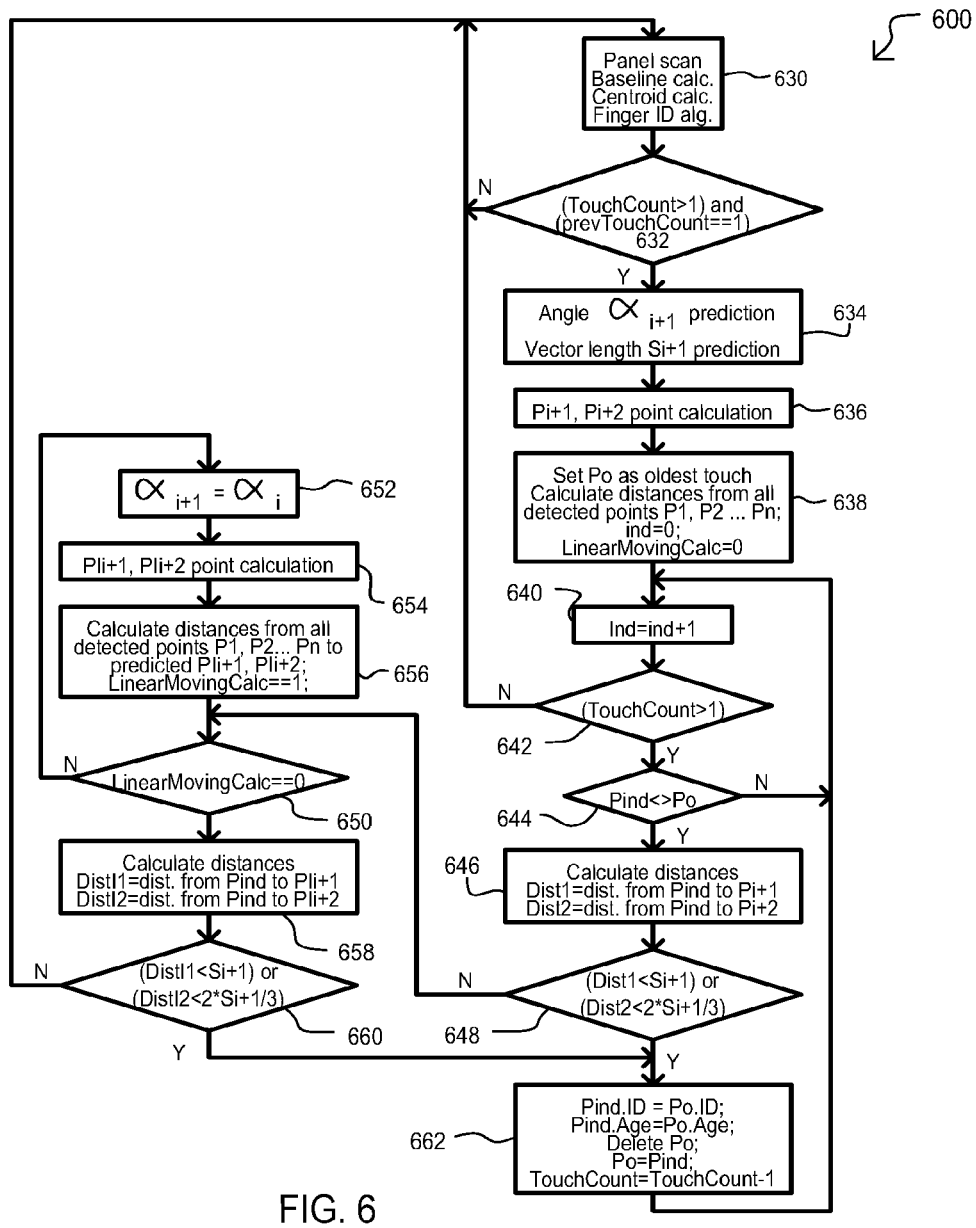
FIG. 6 is a flow diagram of a method according to another embodiment.
FIG. 7 is a table showing test results of a method like that of FIG. 6.

Referring to FIG. 6, a method 600 according to another embodiment is shown in a flow diagram. A method 600 can be one implementation of that shown in FIG. 5. A method 600 can include performing scanning operations on a touch panel until a touch is detected (630, 632). In the embodiment shown, such an action can include performing baseline calculations for sensors, which can aid in distinguishing touch events. Centroid calculations can be performed on raw data values to determine touch locations. A finger ID algorithm can distinguish different touch objects (e.g., fingers).

From a set of touch positions, a method 600 can calculate a vector angle ($\alpha_{i+1}$) and vector length (S$_{i+1}$) of a vector that projects to a predicted position (634). In some embodiments, such calculations can be as described in the embodiments herein, or equivalents. With such vector values, a method 600 can determine predicted positions (636). In some embodiments, such calculations can be as described herein, or equivalents.

In the embodiment shown, a position P$_0$ can be set as the oldest position from the sensed positions. The distances from all sensed positions (e.g., detected points) can be calculated. In addition, a flag (LinearMovingCalc=0) can be set (638). Such a flag can indicate that a linear prediction (as shown in FIG. 5) has not taken place.

If a new touch position (Pind) is indicated (Y from 642 and 644), a method 600 can calculate distances (Dist1, Dist2) between the new touch position and the predicted positions (P$_{i+1}$ and P$_{i+2}$) (646).

If the new position is within predetermined proximities to the predicted positions (Y from 648), the new position can be assigned to the same track, and given a same aging value as P$_0$. The old P$_0$ value can be deleted and the new positions can be assigned to the P$_0$ value. A touch count can be decremented, and a method 600 can return to 640 to check for any new touch positions.

If a new position is not within predetermined proximities to the predicted positions (N from 648), a method 600 can check to see if "linear" prediction points have been calculated according to flag LinearMovingCalc (650). If such values have not been calculated (N from 650), a method 600 can generated two "linear" prediction positions (P1$_{i+1}$ and P1$_{i+2}$) (652 and 654). In the embodiment shown, such an action can include calculations as described for FIG. 5, using a vector angle corresponding to the latest two sensed position values (i.e., $\alpha_{i+1}=\alpha_i$).

A method 600 can calculate distances (Dist1, Dist2) between the new touch position of the new touch and the two linear predicted positions (P1$_{i+1}$ and P1$_{i+2}$) (658).

If the new position is within predetermined proximities to the linear predicted positions (Y from 660), the method can proceed to box 662. If the new position is not within predetermined proximities to the linear predicted positions (N from 660), the method can return to box 630.

FIG. 7 is a table showing test results generated with the method shown in FIG. 6. Tests were conducted with a programmable system on chip integrated circuit (IC) connected to a mutual capacitance sense touch screen. Square root calculations were accomplished using a CORDIC algorithm. Trigonometric functions were based on approximations having a 1% error level. Calculations to filter touches (as belonging or not belonging to a track) were executed in 250 µs when a new touch appeared, and 20 µs when a touch count was stable.

A finger executed three types of gestures: circular (smooth trajectory, low acceleration), zigzag (sharp direction change, sharp acceleration), and flicks. Testing was undertaken for every gesture within 1 minute. Finger speeds during the testing ranged from 2-3 m/s. False touch appearances (events when quantity of touches was greater than one) and false touch rejections (those discarded by the method) were calculated. As shown, a high degree of error correction was achieved.

It is understood that FIG. 7 represents results for but one test system and one particular prediction filtering configuration.

While embodiments like those of FIGS. 3-6 show position prediction based on linear type prediction, alternate embodiments can generate a predicted position based on assuming an object has constant acceleration. That is, a predicted position is generated based on an acceleration value derived from previous sensed positions. One very particular embodiment based on constant acceleration will now be described.

Assuming a constant acceleration, projected positions (in an x,y coordinate system) can be derived as follows:

$$x=x_0+v_x t+(a_x/2)t^2$$

$$y=y_0+v_y t+(a_y/2)t^2$$

Where x$_0$ and y$_0$ are coordinates of a detected object position, v$_x$ and v$_y$ are initial object velocities (along axes directions), a$_x$ and a$_y$ are the acceleration of the object (along axes directions).

Taking the above relationships, equations can be derived for four positions (only x-axis positions are shown—x$_i$, x$_{i+1}$, x$_{i+2}$, x$_{i+3}$) as follows:

$$x_{i-1}=x_i+v_x\Delta t+(a_x/2)\Delta t^2 \text{ (at } t=\Delta t)$$

$$x_{i+2}=x_i+2v_x\Delta t+4(a_x/2)\Delta t^2 \text{ (at } t=2\Delta t)$$

$$x_{i+3}=x_i+3v_x\Delta t+9(a_x/2)\Delta t^2 \text{ (at } t=3\Delta t).$$

It is understood that the y-axis positions follow the same relationships.

In the above three equations, x$_i$, x$_{i+1}$, x$_{i+2}$ can be previously detected positions, and position x$_{i+3}$ can be a predicted position. Using the following substitutions $$C_1 = v_x \Delta t$$

$$C_2 = (a_x/2)\Delta t^2$$

the three linear equations can be rewritten as follows:

$$x_{i-1} = x_i + C_1 + C_2$$

$$x_{i+2} = x_i + 2C_1 + 4C_2$$

$$x_{i+3} = x_i + 3C_1 + 9C_2.$$

Representing $C_1$ and $C_2$ as functions of $x_i$, $x_{i+1}$, $x_{i+2}$, can result in the following equation for predicted position $x_{i+3}$.

$$x_{i+3} = x_i - 3x_{i+1} + 3x_{i+2}.$$

The generation of a corresponding predicted y-axis position ($y_{i+3}$) follows from the above description.

It is noted that a constant acceleration approach, such as that shown above, can generate a predicted positions with a substantially simpler calculation than those of FIGS. 3-6, and without the need for a trigonometric function.

While the particular constant acceleration embodiment shown above relies on a history of three previous positions, other embodiments can generate a predicted position based on a greater number of positions. Further, in such embodiments, an acceleration value can be a function of time (e.g., an acceleration value for projecting a fifth point can be generated from a first acceleration value corresponding to first, second and third points, and a second acceleration value corresponding to second, third and fourth points).

Calculations needed for generating predicted positions and then filtering sensed positions based on a proximity to such predicted positions, can introduce some latency into input results, as compared to processing that does not include such filtering. In some embodiments, a speed of predictive based filtering can be adjusted, or such filtering disabled in response to an object velocity value. An object velocity value can be a detected value (i.e., sensed by a system) or can be a value provided by an application (that anticipates certain object speeds). A method for adjusting predictive filtering is shown in FIG. 8.

Figure 8:
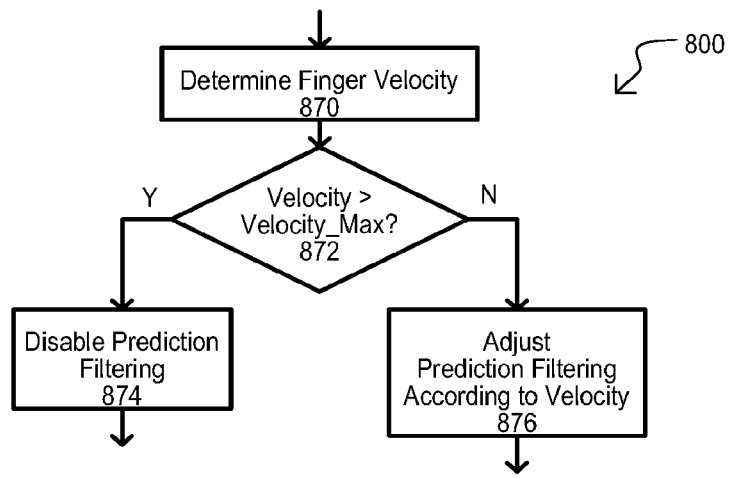
FIG. 8 is a flow diagram of a method that alters prediction filtering based on an object velocity value.

FIG. 8 is a flow diagram of a method 800 according to another embodiment. A method 800 can include determining an object velocity (in this embodiment a finger) (870). As noted above, in some embodiments, such an action can include generating a velocity value based on sensed positions. In addition or alternatively, such an action can include using a value provided by an application, or the like.

In the particular embodiment shown, if an object velocity is greater than a predetermined maximum velocity (Velocity_Max) (Y from 872), a method 800 can disable prediction filtering (i.e., filtering as shown in the embodiments above, or equivalents), as an expected velocity will be too fast as compared to a calculation latency.

In contrast, in the particular embodiment shown, if an object velocity is not greater than a maximum velocity (N from 872), a method 800 can adjust a prediction filtering according to the detected velocity (876). In embodiments, such an action can include, but is not limited to: changing a type of algorithm, changing an accuracy of calculation, changing the types of prediction positions, etc.

It is understood that while FIG. 8 shows disabling or adjusting of filtering, other embodiments can include just one such feature.

Figure 9:
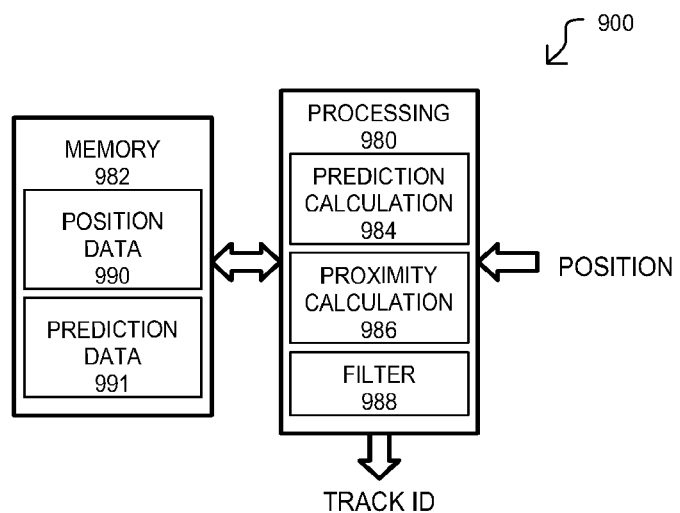
FIG. 9 is a block schematic diagram of a system according to an embodiment.

FIG. 9 shows a system 900 according to an embodiment. A system 900 can include a processing section 980 and a memory section 982. A processing section 980 can include, but is not limited to, custom logic, programmable logic, and a processor subsystem. A processing section 980 can receive position data (POSITION) reflecting detected positions of objects in a sense area, and can access memory section 982 to store and retrieve data values.

A processing section 980 can implement a number of different processing functions, including a prediction section 984, a proximity section 986, and a filter section 988. A prediction section 984 can generate one or more predicted positions based on previous position values. In particular embodiments, a prediction section 984 can generate predicted positions according to any of the methods shown herein, or equivalents.

A proximity section 986 can generate one or more proximity values based on previous position values. In particular embodiments, a proximity section 984 can generate proximity values according to any of the methods shown herein, or equivalents.

A filter section 988 can determine if a sensed position is within a predetermined proximity (generated by proximity section 986) to a predicted position (generated by prediction section 984). Based on such a determination, a filter section 988 can indicate if the sensed position is associated with a given object track or not.

A memory section 982 can store position data 990 and prediction data 991. Position data can represent positions of one or more objects following one or more tracks. Prediction data 991 can store predicted positions and proximity values for use by filter section 988.

Figure 10:
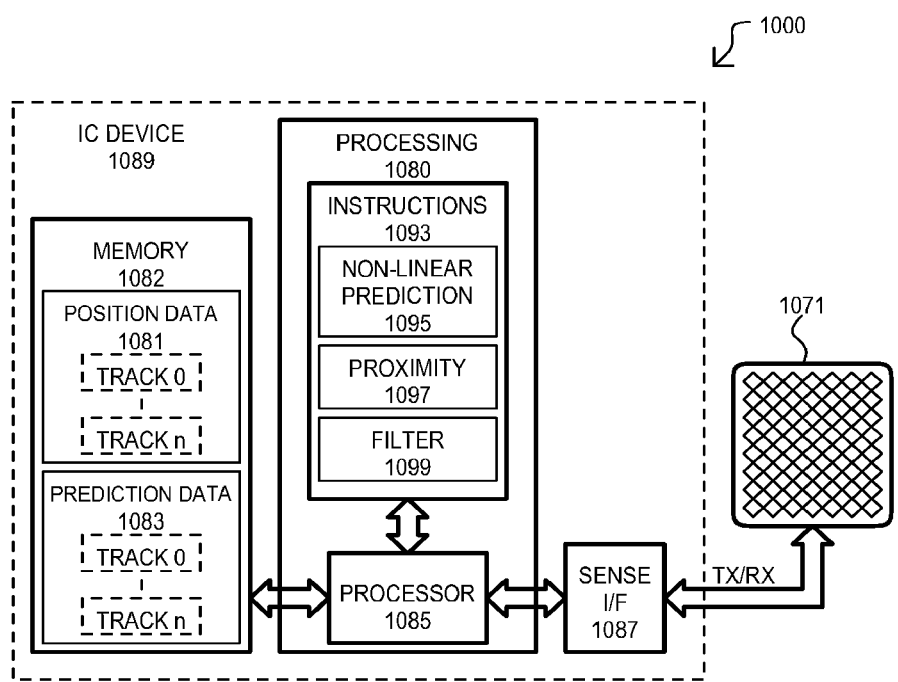
FIG. 10 is a block schematic diagram of a system according to another embodiment.

FIG. 10 shows a system 1000 according to a further embodiment. In one embodiment, a system 1000 can be one particular implementation of that shown in FIG. 9. System 1000 can include a processing section 1080, a memory section 1082, a sense section 1087, and mutual capacitance sense network 1071.

A mutual capacitance sense network 1071 can include transmit (TX) and receive (RX) electrodes, and can generate capacitance values that vary according to the proximity of objects. In one embodiment, TX and RX electrodes can be perpendicular to one another, with TX electrodes being driven to induce a change on RX electrodes. Such changes can be sensed to detect variations in capacitance, and hence the proximity of an object. A position of the object can be determined based on the TX electrode driven, and the RX electrode exhibiting the change in capacitance.

A sense section 1087 can drive TX electrodes of network 1071 and sense values on RX electrodes. In some embodiments "raw" sense values (e.g., counts) can be provided to processor 1085. Processor 1085 can then execute a routine (e.g., centroid calculation) to determine a position of a touch. In other embodiments, a sense section 1087 can be more sophisticated, determining touch positions (e.g., the sense section can perform calculations and provide position values to processor 1085).

A processing section 1080 can include a processor 1085 and instructions 1093 executable by the processor 1085. In the embodiment shown, instructions 1093 can include non-linear prediction instructions 1095, proximity instructions 1097, and filter instructions 1099.

Non-linear prediction instructions 1095 can be executed by processor 1085 to generate one or more prediction positions based on a non-linear function that utilizes previously sensed positions. In a very particular embodiment, such a non-linear function can include one like that described in conjunction with any of FIGS. 3, 5, 6 or equivalents.

Proximity instructions 1097 can be executed by processor 1085 to generate one or more proximity values corresponding to each predicted position, where proximity values are based on previously sensed positions. In a particular embodiment, proximity values can be calculated as described in conjunction with any of FIGS. 3, 5 6 or equivalents.

Filter instructions 1099 can be executed by processor 1085 to determine if sensed positions are within given proximities to predicted positions.

A memory section 1082 can store position data 1081 values for various tracks, to enable a system 1000 to detect and predict locations for multiple different objects (e.g., fingers). Similarly, a memory section 1082 can store predicted position 1083 generated by processor for various tracks.

While memory section 1082 and instructions 1093 may exist in different memories (e.g., one in a volatile memory the other as firmware in a nonvolatile memory), in alternate embodiments such data can occupy different locations in a same memory.

In the particular embodiment shown, a processing section 1080, a memory section 1082, and a sense section 1087 can be parts of a same integrated circuit (IC) device 1089. For example, such sections can be formed in a same IC substrate, or may be formed in a same package (e.g., multi-chip package). In one very particular embodiment, an IC device can be from the PsoC® family of programmable embedded system-on-chip devices, manufactures by Cypress Semiconductor Corporation of San Jose, Calif., U.S.A.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
   determining a plurality of contact positions of a first object path for a first object proximate to a touch sense region of a touch display;
   generating at least a first predicted position based on the plurality of contact positions;
   obtaining a subsequent sense position on the touch sense region;
      in accordance with a determination that the sense position is within a first proximity to the first predicted position, associating the sense position with the first object path; and
      if in accordance with a determination that the sense position is outside of the first proximity from the first predicted position, associating the sense position with a second object path that is distinct from the first object path.

2. The method of claim 1, further comprising:
   determining that the plurality of contact positions are associated with a constant acceleration, wherein generating at least the first predicted position based on the plurality of contact positions further includes deriving the constant acceleration from the plurality of contact positions.

3. The method of claim 1, wherein generating at least the first predicted position based on the plurality of contact positions further comprises:
   combining the plurality of contact positions according to a linear relationship.

4. The method of claim 3, wherein the plurality of contact positions includes three consecutive contact positions that are obtained prior to generating the first predicted position.

5. The method of claim 3, wherein the plurality of contact positions include a first contact position $(x_i, y_i)$ a second contact position $(x_{i+1}, y_{i+1})$ and a third position $(x_{i+2}, y_{i+2})$ that are obtained consecutively prior to generating the first predicted position $(x_{i+3}, y_{i+3})$, and wherein $$x_{i+3}=x_i-3x_{i+1}+3x_{i+2} \text{ and } y_{i+3}=y_i-3y_{i+1}+3y_{i+2}.$$

6. The method of claim 1, wherein:
   determining the plurality of contact positions includes generating Cartesian coordinates based on transmission electrodes and receiving electrodes of a mutual capacitance sense network.

7. The method of claim 1, further comprising:
   generating a first prediction vector that projects from a first contact position of the plurality of contact positions to the predicted position, wherein the first contact position is the most recently obtained contact position among the plurality of contact positions,
   generating a second prediction vector that is a scalar of the first prediction vector, and
   determining a second predicted position by projecting the second prediction vector from that first predicted position to a second predicted position; and
   associating the sense position with the object path in accordance with a determination that the sense position is within a second proximity to the second predicted position.

8. The method of claim 1, further comprising:
   determining a velocity value for the object from the plurality of contact positions; and
   in accordance with a determination that the velocity is greater than a maximum velocity limit, aborting associating the sense position with the first object path.

9. The method of claim 1, further comprising:
   determining a velocity value for the object; and
   in accordance with the velocity value, adjusting a speed of the operations of generating at least the first predicted position and associating the sense position with the object path.

10. The method of claim 1, wherein the first proximity is measured by a distance between one of the plurality of contact positions and the predicted position.

11. A touch sense system, comprising:
   a touch sense region on a touch display; and
   memory;
   wherein the touch sense system is configured for:
      determining a plurality of contact positions of a first object path for a first object proximate to a touch sense region of a touch display;

generating at least a first predicted position based on the plurality of contact positions;

obtaining a subsequent sense position on the touch sense region;

in accordance with a determination that the sense position is within a first proximity to the first predicted position, associating the sense position with the first object path; and in accordance with a determination that the sense position is outside of the first proximity from the first predicted position, associating the sense position with a second object path that is distinct from the first object path.

12. The touch sense system of claim 11, wherein the touch sense system is configured to determine that the plurality of contact positions is associated with a constant acceleration, and generate at least the first predicted position by deriving the constant acceleration from the plurality of contact positions.

13. The touch sense system of claim 11, wherein the prediction section is configured to generate at least the first predicted position at least by combining the plurality of contact positions according to a linear relationship.

14. The touch sense system of claim 13, wherein the plurality of contact positions includes three consecutive contact positions that are obtained prior to generating the first predicted position.

15. The touch sense system of claim 13, wherein the plurality of contact positions includes a first contact position ($x_i$, $y_i$) a second contact position ($x_{i+1}$, $y_{i+1}$) and a third position ($x_{i+2}$, $y_{i+2}$) that are obtained consecutively prior to generating the first predicted position ($x_{i+3}$, $y_{i+3}$), and wherein $$x_{i+3}=x_i-3x_{i+1}+3x_{i+2} \text{ and } y_{i+3}=y_i-3y_{i+1}+3y_{i+2}.$$

16. The touch sense system of claim 11, wherein:

determining the plurality of contact positions includes generating Cartesian coordinates based on transmission electrodes and receiving electrodes of a mutual capacitance sense network.

17. The touch sense system of claim 11, further comprising:

generating a first prediction vector that projects from a first contact position of the plurality of contact positions to the predicted position, wherein the first contact position is the most recently obtained contact position among the plurality of contact positions, generating a second prediction vector that is a scalar of the first prediction vector, and determining a second predicted position by projecting the second prediction vector from that first predicted position to a second predicted position; and associating the sense position with the object path in accordance with a determination that the sense position is within a second proximity to the second predicted position.

18. The touch sense system of claim 11, wherein the touch sense system is further configured for:

determining a velocity value for the object from the plurality of contact positions; and in accordance with a determination that the velocity is greater than a maximum velocity limit, aborting associating the sense position with the first object path.

19. The touch sense system of claim 11, wherein the touch sense system is further configured for:

determining a velocity value for the object; and in accordance with the velocity value, adjusting a speed of the operations of generating at least the first predicted position and associating the sense position with the object path.

20. A touch sense system, comprising:

(1) a processing section including:

a sense section configured to obtain a plurality of contact positions identified along an object path in a touch sense region when one or more objects move across the touch sense region;

a prediction section configured to:

determine that the plurality of contact positions are associated with a constant acceleration, including determining that the plurality of contact positions are created when the one or more objects move across the touch sense region with the constant acceleration; and in accordance with a determination that the plurality of contact positions are associated with the constant acceleration, generate at least a first predicted position based on the plurality of contact positions; and a filter section configured to obtain a sense position and associate the sense position with the object path in accordance with a determination that the sense position is within a first proximity to the first predicted position; and (2) a memory system configured to store at least the plurality of contact positions and the first predicted position.

* * * * *